United States Patent [19]

Schlegel et al.

[11] 4,094,449
[45] June 13, 1978

[54] DECANTER HANDLE STRUCTURE

[75] Inventors: Norman H. Schlegel; Harvey R. Karlen, both of Chicago, Ill.

[73] Assignee: Cory Food Services, Inc., Chicago, Ill.

[21] Appl. No.: 434,810

[22] Filed: Jan. 21, 1974

Related U.S. Application Data

[63] Continuation of Ser. No. 285,090, Aug. 30, 1972, abandoned.

[51] Int. Cl.² ............................................. B65D 23/10
[52] U.S. Cl. ................................ 222/475; 16/114 A; 215/100 A
[58] Field of Search ............... 222/465, 467, 475, 566, 222/573; 215/100 A; 220/94 R, 85 H; 294/31.2, 33, 27 R, 27 H; 16/110 A, 114 A; 99/292

[56] References Cited

U.S. PATENT DOCUMENTS

| | | | |
|---|---|---|---|
| 2,575,260 | 11/1951 | Cronholm | 99/292 |
| 2,610,081 | 9/1952 | Bushman | 215/100 A X |
| 2,807,944 | 10/1957 | Glass | 222/573 X |
| 3,021,026 | 2/1962 | Clare | 294/27 R X |
| 3,516,580 | 6/1970 | Hester | 294/31.2 X |
| 3,688,936 | 9/1972 | Killigrew | 215/100 A |
| 3,717,288 | 2/1973 | Schlegel | 222/465 |
| 3,800,988 | 4/1974 | Karlen et al. | 222/465 |

Primary Examiner—Stanley H. Tollberg
Assistant Examiner—Francis J. Bartuska
Attorney, Agent, or Firm—Wegner, Stellman, McCord, Wiles & Wood

[57] ABSTRACT

A one-piece handle structure for use in carrying a decanter having a lower bowl portion and an upper neck portion. The handle structure includes a collar portion embracing the neck of the decanter and a protective band embracing the bowl of the decanter. The handle is longitudinally split. The collar and band comprise C-shaped elements having their opposite ends connected to the opposite split portions of the handle at the top and bottom thereof, respectively. The front portion of the collar is continuous and underlies the pouring spout of the neck to protect the spout in use.

6 Claims, 8 Drawing Figures

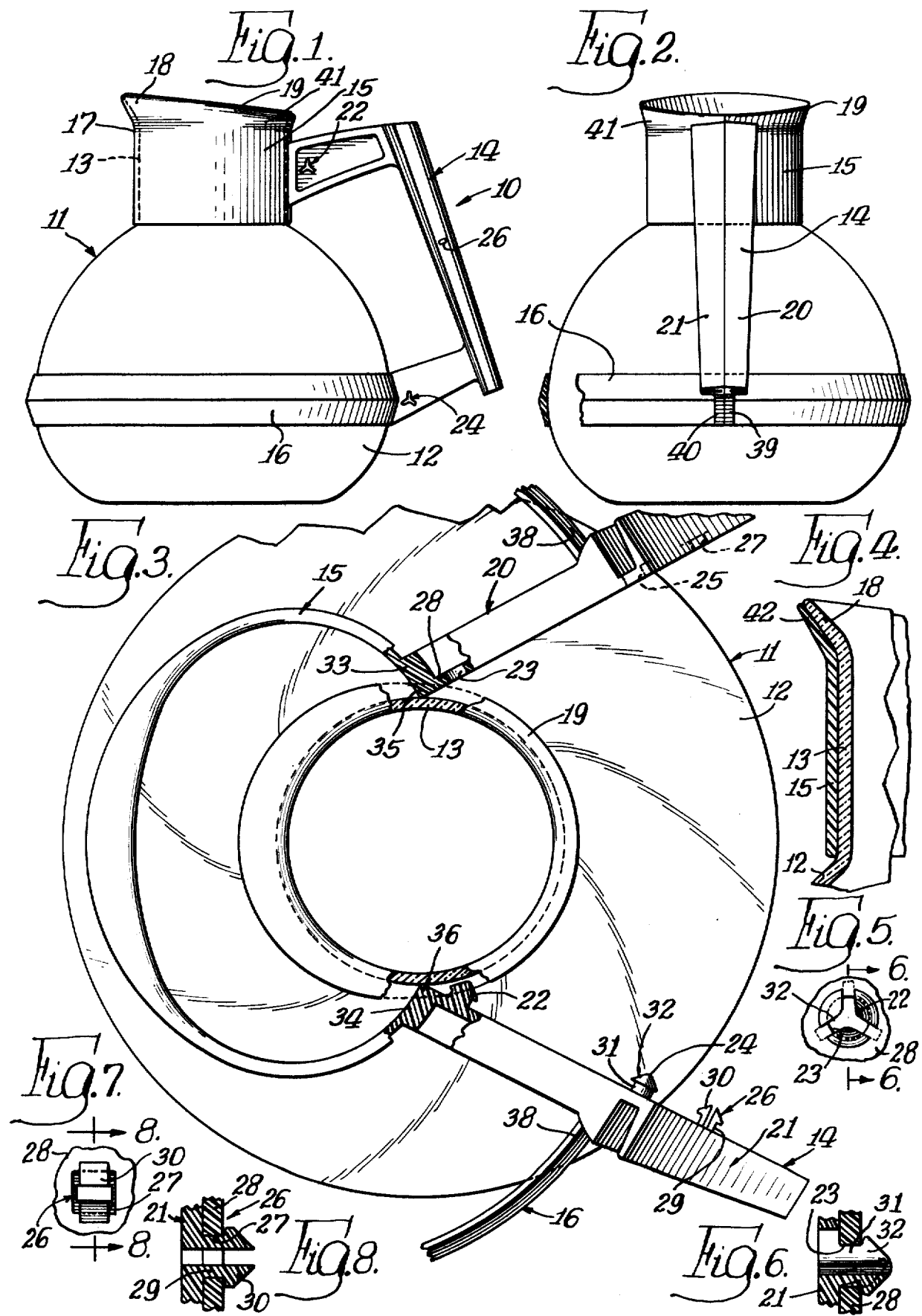

DECANTER HANDLE STRUCTURE

This application is a continuation of application Ser. No. 285,090 filed Aug. 30, 1972, now abandoned.

BACKGROUND OF THE INVENTION

1. Field of the Invention

This invention relates to pouring devices and in particular to handle structures for use with pouring devices such as decanters.

2. Description of the Prior Art

In the copending application Ser. No. 126,853 now U.S. Pat. No. 3,717,288 of Norman H. Schlegel for a Decanter Handle Structure, owned by the assignee hereof, a decanter handle structure is disclosed as having a one-piece handle and an annular band secured to the lower portion of the handle for encircling the bowl of the decanter. At the upper end of the handle is provided a segmentally cylindrical collar having an open portion adapted to permit slipping of the collar transversely about the decanter neck to complete the installation of the handle structure on the decanter. The open portion of the collar may be at the front of the collar subjacent the pouring spout of the decanter neck, or may be at the side of the collar as shown in said application. As indicated in said application, the decanter handle structure disclosed therein comprises an improvement over other pouring devices such as shown in the U.S. Patent owned by the assignee hereof, including Harvey R. Karlen U.S. Pat. No. 2,554,367, David C. Eisendrath U.S. Pat. No 2,982,451, and S. H. Frankel U.S. Pat. No. 2,552,420.

Additional prior art patents of interest in connection with the development are those of:

| Patentee | Pat. No. |
|---|---|
| C. E. Pierce | 622,886 |
| W. H. Goddard | 679,742 |
| P. Grabler | 1,038,116 |
| Wm. Hoskin | 1,377,350 |
| Wm. R. Mahnkin | 1,446,474 |
| H.A.W. Ward | 1,464,789 |
| J. B. Holden | 1,730,820 |
| E. J. Harris | 1,735,502 |
| B. B. Kosanovich | 1,953,238 |
| C. E. Edwards et al | 1,994,415 |
| A. C. Blevins | 2,029,051 |
| E. H. Stibbe | 2,055,854 |
| B. Mackilbank | 2,070,367 |
| F. S. Milburn | 2,075,217 |
| W. G. Bryant | 2,101,526 |
| A. L. Rosenheimer, Jr. | 2,231,222 |
| L. R. Westby | 2,417,335 |
| H. E. Stevens | 2,463,651 |
| F.N. Cronholm | 2,575,260 |
| E. F. Bushman | 2,610,081 |
| M. L. Glass | 2,807,944 |
| G. Clare | 3,021,026 |
| D. L. Killigrew, Jr. | 3,688,936 |

SUMMARY OF THE INVENTION

The present invention comprehends a further improved decanter handle structure wherein the handle is longitudinally split. The collar and band portions of the structure are C-shaped, having their opposite ends fixedly secured to the opposite halves of the handle at the top and bottom thereof, respectively. Means are provided in association with the handle portions for locking the handle portions together to maintain the handle structure in assembled relationship on a decanter with the collar encircling the neck of the decanter and the hand encircling the bowl of the decanter. Thus, the securing means serves not only to hold the handle portions together, but also to lock the collar and band about the decanter neck and bowl portions.

To provide effectively maximum holding of the collar and band about the decanter, the securing means may include one portion adjacent the collar ends and another portion adjacent the band ends. The securing means may be formed integrally with the handle. The entire handle structure may be formed as a one-piece construction as by the molding thereof from a suitable plastic, such as polypropylene.

The securing means are augmented in the normal use of the handle structure by the person's hand gripping the handle and thereby tending to hold the split portions thereof together. Thus, the collar and band are effectively positively locked about the neck and bowl of the decanter effectively assuring maintained support of the decanter in a pouring operation. The collar may include a continuous front portion underlying the pouring spout of the decanter neck to protect the spout against chipping where the decanter is formed of a frangible material, such as glass. The band protects the bowl portion of the decanter similarly against damage by acting as a protective bumper substantially fully about the decanter bowl.

The securing means may be separable to permit removal of the handle structure from the decanter when desired such as for maintenance purposes. Illustratively, the securing means may comprise interfitted male and female connectors extending between the two halves of the split handle.

Thus, the handle structure of the present invention is extremely simple and economical of construction while yet providing the improved features discussed above.

BRIEF DESCRIPTION OF THE DRAWING

Other features and advantages of the invention will be apparent from the following description taken in connection with the accompanying drawing wherein:

FIG. 1 is a side elevation of a decanter having a handle structure embodying the invention;

FIG. 2 is a rear elevation thereof with a portion of the band broken away;

FIG. 3 is a fragmentary top plan view thereof with portions broken away illustrating the mounting of the handle structure on the decanter;

FIG. 4 is a fragmentary vertical section of the front portion of the handle structure collar and decanter neck;

FIG. 5 is an end view of the male connecting elements at the top and bottom of the handle structure;

FIG. 6 is a vertical section taken substantially along the line 6—6 of FIG. 5;

FIG. 7 is an end view of the male element at the center of the handle structure; and FIG. 8 is a vertical section taken substantially along the line 8—8 of FIG. 7.

DESCRIPTION OF THE PREFERRED EMBODIMENT

In the exemplary embodiment of the invention as shown in the drawing, a handle structure generally designated 10 is shown for use with a pouring device illustratively comprising a decanter 11 having a lower bowl portion 12 and an upper tubular neck portion 13.

Handle structure 10 includes a handle portion 14, an upper collar 15 and a lower band 16. The collar 15 embraces the decanter neck 13 and includes a closed forward portion 17 underlying the pouring spout 18 defined by an outturned distal end 19 of the neck.

As best seen in FIG. 3, handle 14 comprises a longitudinally split handle defining a first half portion 20 and an opposite, second half portion 21. The handle portions may be releasably secured together in the decanter-mounted arrangement by suitable locking means. In the illustrated embodiment, the locking means comprises an upper male element 22 on handle portion 21 engageable with an upper female means 23 on handle portion 20, a lower male element 24 on handle portion 21 engageable with a lower female means 25 on handle portion 20, and a middle male element 26 on handle portion 21 engageable with a middle female means 27 on handle portion 20. As shown in FIG. 3, handle portion 29 may comprise a longitudinally extending thin inner wall 28 with the female securing means 23, 25 and 27 comprising openings in the wall. The male element 26 illustratively defines a diametrically split element including a cylindrical stem portion 29 and an outer enlarged head portion 30. Male elements 22 and 24 include stem portions 31 and outer trifurcated enlarged head portions 32. As shown in FIGS. 6 and 8, the stem portions 29 and 31 have a length substantially equal to the thickness of handle wall 28 so that when the head portions 30 and 32 of the male elements are inserted fully through the openings 23, 25 and 27, handle portion 21 is effectively locked to handle portion 20 to define the assembled handle 14. As shown in FIG. 1, the upper securing means, including male connector 22, is disposed on handle 14 adjacent collar 15 and the lower securing means defined by male element 24 is disposed on the handle adjacent the band 16. Collar 15, as shown in FIG. 3, comprises a C-shaped tubular element having its opposite ends 33 and 34 secured to the upper end 35 of handle portion 20 and upper end 36 of handle portion 21, respectively. Thus, secure engagement of male securing element 22 with female securing means 23 not only serves to lock the upper portions of the handle together, but also effectively locks the collar 15 in embracing relationship to the decanter neck 13. Similarly, band 16 comprises a C-shaped element having its ends 37 and 38 connected, respectively, to the lower ends 39 and 40 of the handle portions 20 and 21. Thus, lower securing engagement of male securing element 24 with female securing means 25 not only locks the lower portion of the handle, but also effectively locks the band 16 around the lower bowl portion 12.

Collar 15 includes an upper, distal outturned portion 41 which, at the front portion 42 thereof, underlies the pouring spout 18 of the decanter neck. Thus, the collar portion 42 effectively protects the pouring spout 18 against breakage as by forceful engagment with a receptacle during a pouring operation. The band 16 effectively precludes damage to the bowl portion of the decanter as the band encircles the maximum diameter portion of the band and serves as an outer bumper therearound.

The handle structure 10 may be formed as a one-piece molded element whereby the handle structure may have effectively minimum cost. Should the handle structure require replacement, such as because of heat damage or the like, the handle portions are simply pried apart to disengage the securing means and a new similar handle structure installed on the decanter by disposition of the collar and band portions around the neck and bowl portions of the decanter and engaging of the male securing elements 22, 24 and 26 with the female securing means 23, 25 and 27 to lock the replacement handle structure effectively positively on the decanter.

If desired, the securing elements may comprise fasteners secured to the handle portions in lieu of the integral molding thereof to the handle portions.

The split handle construction effectively positively supports the decanter in the pouring operation as the collar and band fully embrace the stem and bowl of the decanter and the user's grip on the handle augments the securing together of the handle portions. Band 16 not only serves to protect the bowl portion 12 of the decanter against damage, but also stabilizes the lower end of the handle to provide an improved support of the decanter by the user's grasp on the handle 14.

The foregoing disclosure of specific embodiments is illustrative of the broad inventive concepts comprehended by the invention.

We claim:

1. For use with a glass decanter having a globular bowl portion having a bottom and terminating in an upper tubular portion defining a pouring spout, a handle structure comprising
a unitary element defining an annular collar having spaced apposed rear ends and adapted to embrace said spout, a segmentally annular band having spaced apposed rear ends adapted to be separably juxtaposed to cause said band to grip said bowl portion at a position spaced above said bottom thereof, and a longitudinally split handle having a first portion connecting one of said collar ends to one of said band ends, a second portion connecting the other of said collar ends to the other of said band ends, and locking means defined by portions of said handle first and second portions immediately adjacent said rear ends of said band and collar for releasably locking said handle first and second portions together to retain said collar about said spout and said band about said bowl portion spaced above said bottom thereof as a result of the releasable retention of said handle portions together to define a handle for carrying the decanter, each of said collar and band being free of fold portions and defining a continuous arcuate cross section at all times.

2. The decanter handle structure of claim 1 wherein said spout defines a distal outturned end defining a forward pouring lip and said collar includes a forward portion underlying and complementary to said lip and terminating at the distal edge of said lip.

3. The decanter handle structure of claim 1 wherein said locking means comprises cooperating female and male portions of said handle portions.

4. The decanter handle structure of claim 1 wherein said element is formed of molded plastic and said locking means are molded integrally therewith.

5. The decanter handle structure of claim 1 wherein said element is formed of a resilient, molded plastic.

6. The decanter handle structure of claim 1 wherein said spout defines a distal outturned end defining a forward pouring lip, said collar includes a forward portion underlying and complementary to said lip and terminating at the distal edge of said lip, and said collar further defining an outwardly turned portion rearwardly of said forward portion conforming to the underside of said spout outturned end rearwardly of said pouring lip.

* * * * *